June 10, 1947. W. F. PECK 2,421,805
SEALING MEANS FOR OPTICAL INSTRUMENTS
Filed May 14, 1943 2 Sheets-Sheet 1
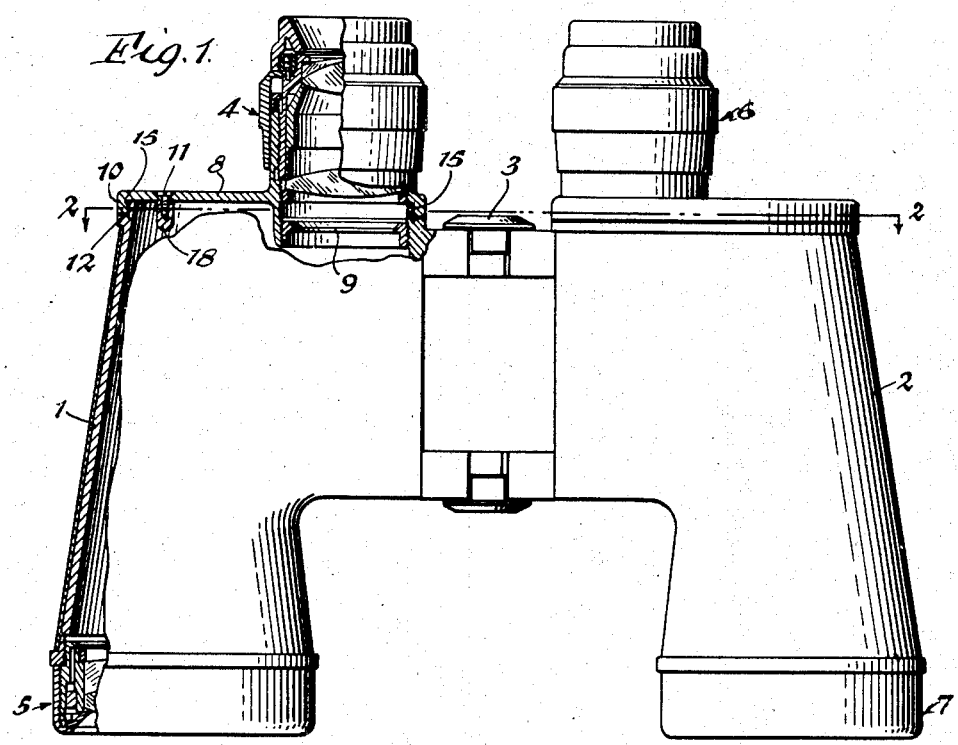
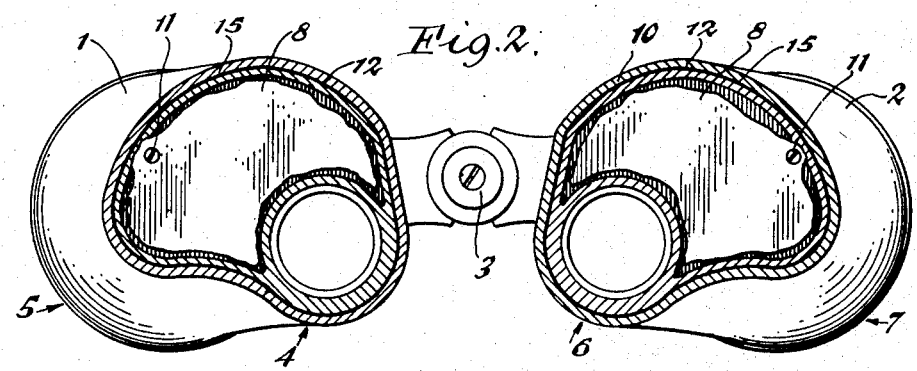
INVENTOR
WILLIAM F. PECK
BY
*Raymond A. Paquin*
ATTORNEY June 10, 1947.  W. F. PECK  2,421,805
SEALING MEANS FOR OPTICAL INSTRUMENTS
Filed May 14, 1943  2 Sheets-Sheet 2
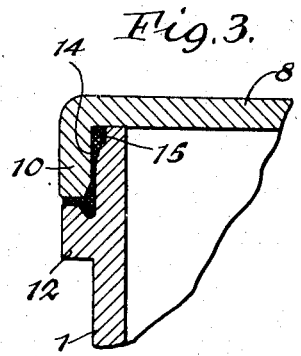
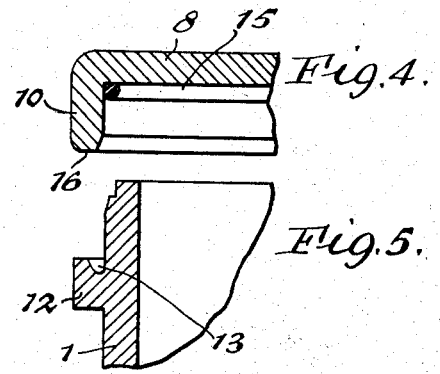
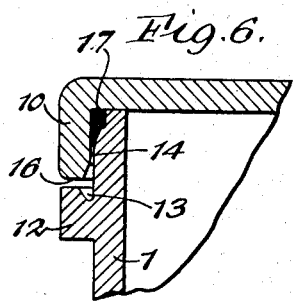
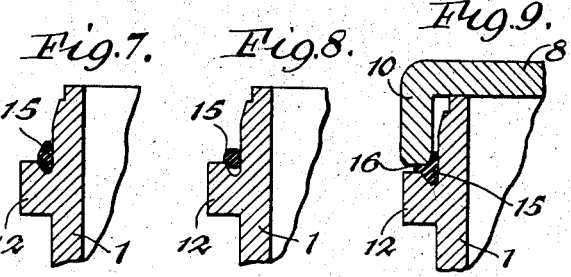
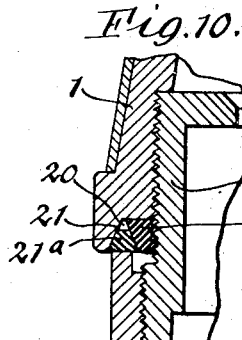
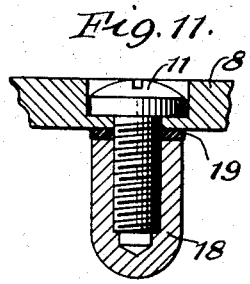
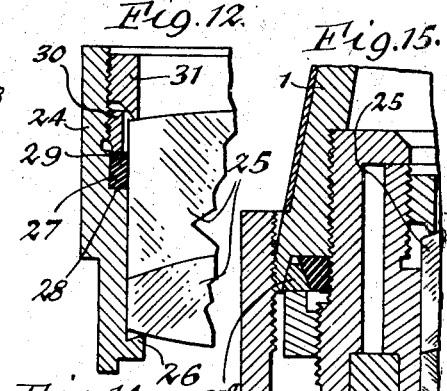
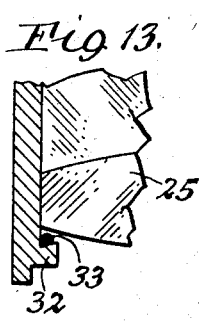
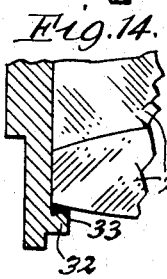
INVENTOR.
WILLIAM F. PECK
BY Raymond A. Paquin
ATTORNEY Patented June 10, 1947

2,421,805

UNITED STATES PATENT OFFICE 2,421,805

SEALING MEANS FOR OPTICAL INSTRUMENTS

William F. Peck, Buffalo, N. Y., assignor, by mesne assignments, to American Optical Company, Southbridge, Mass., a voluntary association Application May 14, 1943, Serial No. 486,957

2 Claims. (Cl. 88—34)

This invention relates to improvements in optical instruments and has particular reference to new and improved means for sealing the connections between the parts of such instruments to prevent the entrance of dust and moisture therein.

An object of the invention is to provide a new and improved means for sealing the connections between parts of optical instruments or the like to prevent the entrance of dust and/or moisture through said connections.

Another object of the invention is to provide a new and improved means of the type set forth which is relatively simple and economical in construction and yet efficient in operation.

Other objects and advantages of the invention will be apparent from the following description taken in connection with the accompanying drawings. It will be understood that many changes may be made in the details of construction, arrangements of parts and steps of the process without departing from the scope of the invention as set forth in the accompanying claims. I therefore do not wish to be limited to the exact details of construction, arrangement of parts and steps of the process shown and described as the preferred arrangement and process has been shown by way of illustration only.

Referring to the drawings:

Fig. 1 is a top or plan view, partly in section, of a pair of binoculars embodying the invention.

Fig. 2 is a sectional view taken on line 2—2 of Fig. 1 and looking in the direction of the arrows.

Fig. 3 is a fragmentary sectional view on an enlarged scale of one of the connections shown in Fig. 1.

Figs. 4 to 6 inclusive are views showing steps in the process.

Figs. 7, 8, and 9 are views showing other steps in the process.

Figs. 10 and 12 are sectional views showing the invention applied to an objective mount for a binocular.

Fig. 11 is a sectional view on an enlarged scale of the arrangement for sealing the securing screw shown in section in Fig. 1.

The Figs. 13 and 14 are sectional views showing means for sealing the lens holding arrangement; and Fig. 15 is a sectional view showing an arrangement for sealing the objective mount of binoculars or the like.

In the construction of optical instruments such as prism binoculars, field glasses or the like, it is necessary that the various parts such as the casing, cover, eyepiece and objective mount be secured together in such manner that the entrance of dust or moisture into the casing through the connections between the parts is prevented as otherwise such dust or moisture will interfere with the optical performance of the instrument. It is, therefore, an object of this invention to provide new and improved means for joining the parts of optical instruments whereby the entrance of dust and/or moisture into the instrument is prevented.

Referring more particularly to the drawings wherein similar reference characters designate corresponding parts throughout the several views the invention is shown applied to a binocular for the purpose of illustration although it will be understood that the same invention may be applied to other types of instruments. The instrument shown in Fig. 1 comprises the casings 1 and 2 pivotally connected by the hinge 3. The casing 1 is provided with the eyepiece 4 and objective member 5 and the casing 2 is provided with the eyepiece 6 and the objective member 7.

Each of the sections of the binocular is provided with a cover member 8 which may be formed integral with the eyepiece member 4 as shown in the drawings or be formed separately and have the eyepiece assembly secured thereto.

Aligned with the eyepiece 4 is provided the reticule 9.

The cover member 8 has an offset or flange portion 10 which is formed substantially at right angles to the plane of the cover 8 and which flange 10 is adapted to overlie a portion of the surface of the wall of the casing 1 adjacent the edge thereof which is adjacent the said cover member. The cover member 8 is adapted to be retained in position by means of screws or the like 11 of which any desired number may be provided and which are threaded into the threaded openings formed in integral lugs on the interior of the casing 1. The casing 1 is provided with the peripheral flange 12 which flange has the peripheral depression 13 in its upper surface. Between the upper peripheral edge of the casing 1 and the interior surface of the flange 10 is formed a groove or the like 14 which may be formed by grooving the inner surface of the flange 10 or the outer surface of the casing member 1 or both. This groove may be of any desired shape.

In order to seal the joint or connection between the cover 8 and casing 1 there is placed in the groove 14 as mentioned above a sealing medium. This sealing medium may be composed of a sealing wax or a fuseable metal which is preferably a metal that will melt at a low temperature or it may be formed of rubber, Vinylite or other suitable resilient, plastic, or thermoplastic material, said Vinylite being a well-known trade name applied to polyvinyl chloride-acetate, polyvinyl butyral, etc. Also this sealing arrangement may be formed of a plurality of materials, that is one portion thereof may be of rubber or other resilient material and another portion thereof of fuseable material.

It is pointed out that the flange 10 is preferably constructed of such size that it does not engage the upper surface of the flange 12 on the casing 1 but leaves a small space therebetween to facilitate the insertion of the sealing material as shown in the drawings.

The placing of the sealing medium in the groove 14 may be accomplished in a number of different ways. For example, a ring 15 of the sealing material may be placed inside of the cover or cap member 8 as shown in Fig. 4 and the cover member 8 then placed over the top of the casing 1 to compress the sealing medium 15 in the groove 14 and if desired sealing medium such as melted wax or the like or a fuseable metal may then be inserted through the slot or opening between the flanges 10 and 12 or if desired a second ring of sealing medium may be placed in the slot 13 before the cover is put in place whereupon it is compressed by the lower end 16 of the flange 10.

If a resilient ring such as a rubber ring or a ring of Vinylite or the like is used the ring may be circular in crossed section as shown in Fig. 8 or may have an elongated section such as shown in Fig. 7 but in either case when the cover 8 is placed in position the surface 16 will engage the ring and deform it into the position shown in Fig. 9.

It is pointed out that the lower ring is not shown in the slot or groove 13 in Figs. 5 and 6 nor is the upper ring shown in Figs. 7, 8 and 9 but that if desired both said rings may be employed or merely either of them alone in any of the constructions shown.

With the construction shown in Figs. 3 and 6 a sealing medium such as wax or a fusible metal is preferably employed. If desired a single sealing material may be employed or the upper sealing member 17 may have a higher melting or softening point than the sealing medium used in the lower groove 13 or the sealing member 17 may be a resilient ring as previously described and the lower groove filled with a sealing material as also previously described.

In Fig. 11 is shown an arrangement for sealing the screw members for securing the cap 8 to the body 1 wherein the screws 11 which are threaded into threaded openings in the lugs 18 and in this case a washer 19 of a resilient material such as rubber or Vinylite may be used or the washer may be made of a soft metal such as lead etc.

In Fig. 10 is shown an arrangement for sealing the connection between the objective mount and the casing 1 and in this case the lower end of the casing 1 is provided with a grooved portion 20 having an inclined side wall 21 and a metal washer 21a of aluminum or other suitable material having a wedge shaped surface is placed on said objective mount as shown and a ring 23 of a resilient material such as rubber or Vinylite or soft metal such as lead is placed in the groove in the casing 1 as shown and the threaded member 22 is then secured to the threaded portion of the casing 1 and the objective mount 5 and the washer 21a and ring 23 forced into engagement as shown in Fig. 10 to provide a sealed connection between the parts.

In Fig. 12 is shown an arrangement for sealing the connection between the lens retaining members of the objective mount and in this construction the member 24 is shown supporting the lenses 25 on the flange 26 and a ring 27 of resilient material is provided on the flange 28 and a washer 29 is placed thereover and then the threaded ring 30 is threaded into the threaded portion of the mount 24 to tightly engage the washer 29 to compress the same and force it into engagement with the inner surface of the wall 24 and the outer periphery of the lenses 25 and the ring 31 is then threaded into position to retain the lenses in the mount.

If desired a ring 33 of resilient or soft material may be placed against the lower surface of the lens 25 and in a groove on the upper surface of the flange 32 for supporting the lens. This ring 33 may be formed of round material, flat material or other desired cross section and is preferably positioned in the slot formed in the upper surface of the flange 32 and then when the lenses are forced into position by the retaining ring 31 as previously described the ring is compressed to form a sealed connection.

In Fig. 13 the ring 33 is shown prior to the tightening of the lenses in the mount and in Fig. 14 the construction is shown after the lenses have been tightened in the mount to deform the ring 33 to seal the connection.

In Fig. 15 the connection between the objective mount 5 and casing 1 is as shown in Fig. 10 and the sealing ring 33 which the lens 25 engages as shown in Figs. 13 and 14 is shown. In addition the sealing rings 35 of wax or resilient fusible metal may be employed to seal the connections between the parts as shown.

From the above it will be seen that I have provided new and improved means for obtaining all of the objects and advantages of the invention.

Having described my invention, I claim:

1. In an optical instrument of the type described, the combination of a casing for housing optical elements of the instrument, said casing having a rim surrounding an open end thereof and an external peripheral bead spaced from said rim, a cover for said open end of said casing and adapted to seat directly against said rim, an eyepiece member carried by said cover and positioned thereby in fixed relation to the optical elements housed by said casing, said cover having a peripheral flange in spaced relation to said casing and extending toward said bead, said peripheral flange being slightly spaced from said bead when the cover directly seats against said rim, a heat softenable sealing medium in the space between said flange and said casing and a heat softenable sealing medium between said flange and said bead, the first mentioned sealing medium being adapted to soften at a higher temperature than the second mentioned sealing medium, and means for retaining said cover in seated relation against said rim.

2. In an optical instrument of the character described, the combination of a casing forming a dust-proof and moisture-proof housing for optical elements of the instrument, said casing having a flat endless rim surrounding an open end of said casing, an outwardly extending endless peripheral bead upon the outer wall of said casing and in proximity to said rim, a cover for closing the open end of said casing, said cover having a wall portion adapted to seat directly against all portions of said flat endless rim, an eyepiece member carried by the wall portion of said cover and positioned to be in fixed relation to the optical elements housed by said casing, said cover also having an endless peripheral flange supported by the marginal edge of said wall portion so as to overlie the outer wall of said casing adjacent said rim in outwardly spaced relation relative thereto, said flange also being slightly spaced from said endless bead when the cover is seated directly against said rim whereby an endless space having peripheral communications with the exterior is formed between said flange and outer wall and between said flange and bead, a deformable sealing medium in said space, and securing means for drawing said cover into engagement with said sealing medium and rim and for retaining said cover in seated relation against said rim.

WILLIAM F. PECK.

REFERENCES CITED

The following references are of record in the file of this patent:

UNITED STATES PATENTS

| Number | Name | Date |
|---|---|---|
| 1,290,279 | Mihalyi | Jan. 7, 1919 |
| 1,324,448 | Greiner | Dec. 9, 1919 |
| 1,952,224 | Trautmann et al. | Mar. 27, 1934 |
| 2,097,850 | Wallace | Nov. 2, 1937 |
| 1,053,512 | Huntoon et al. | Feb. 18, 1913 |
| 1,445,284 | Bell et al. | Feb. 13, 1923 |
| 2,320,504 | Bailey | June 1, 1943 |
| 1,071,585 | Russell | Aug. 26, 1913 |
| 2,187,396 | Glocker | Jan. 16, 1940 |
| 2,147,325 | Wackman | Feb. 14, 1939 |
| 2,305,589 | Stark et al. | Dec. 22, 1942 |
| 1,311,159 | Freer | July 29, 1919 |
| 2,364,811 | Perkins | Dec. 12, 1944 |
| 904,066 | Jacob | Nov. 17, 1908 |
| 2,323,787 | Bitner | July 6, 1943 |
| 2,124,157 | Trautmann | July 19, 1938 |
| 1,270,876 | Saegmuller et al. | July 2, 1918 |
| 1,515,065 | Milliken | Nov. 11, 1924 |
| 1,687,818 | Wollensak | Oct. 16, 1928 |
| 1,129,523 | Riglander | Feb. 23, 1915 |
| 1,744,444 | Carvalho | Jan. 21, 1930 |

FOREIGN PATENTS

| Number | Country | Date |
|---|---|---|
| 292,470 | Great Britain | Oct. 14, 1929 |
| 363,227 | Great Britain | Dec. 17, 1931 |
| 646,188 | France | July 10, 1928 |
| 286,273 | Germany | July 29, 1915 |